United States Patent [19]

Komatsu

[11] Patent Number: 5,046,572
[45] Date of Patent: Sep. 10, 1991

[54] STEERING CONTROL SYSTEM FOR VEHICLE

[75] Inventor: Koichi Komatsu, Kanagawa, Japan

[73] Assignee: Atsugi Unisia Corporation, Kanagawa, Japan

[21] Appl. No.: 513,845

[22] Filed: Apr. 24, 1990

[30] Foreign Application Priority Data

Apr. 27, 1989 [JP] Japan ............................. 1-50167[U]

[51] Int. Cl.$^5$ ............................................. B62D 6/02
[52] U.S. Cl. .................................... 180/140; 180/142; 180/143
[58] Field of Search ............... 180/140, 141, 142, 143, 180/152, 153; 280/91

[56] References Cited

U.S. PATENT DOCUMENTS

| | | | |
|---|---|---|---|
| 4,621,702 | 11/1986 | Kanazawa et al. | 180/140 |
| 4,640,379 | 2/1987 | Shibahata et al. | 180/140 |
| 4,690,431 | 9/1987 | Ito et al. | 180/140 |
| 4,917,204 | 4/1990 | Andrew et al. | 180/140 |
| 4,934,474 | 6/1990 | Sugasawa | 180/140 |

FOREIGN PATENT DOCUMENTS

| | | | |
|---|---|---|---|
| 196875 | 9/1986 | Japan | 180/140 |
| 23873 | 1/1987 | Japan | 180/140 |
| 2063791 | 6/1981 | United Kingdom | 180/153 |

Primary Examiner—Kenneth R. Rice
Assistant Examiner—Mitchell Bompey
Attorney, Agent, or Firm—Ronald P. Kananen

[57] ABSTRACT

A steering control system for a vehicle is provided. This system includes a front power cylinder which provides steering assistance for front wheels and a rear power cylinder which provides steering assistance for rear wheels. The system further includes a single hydraulic pump which provides a pressurized hydraulic fluid to the front and rear power cylinders and a flow dividing valve which controls a supply rate of the pressurized hydraulic fluid to the front and rear power cylinders based on vehicle speed to steer the front and rear wheels with a preselected steering angle relationship.

5 Claims, 2 Drawing Sheets

STEERING CONTROL SYSTEM FOR VEHICLE

BACKGROUND OF THE INVENTION

1. Technical Field

The present invention relates generally to a steering system for a four wheel steering vehicle. More particularly, the invention relates to a system for controlling the steering angles of front and rear wheels according to a steered angle of a steering wheel to enhance traveling stability when turning.

2. Background Art

A steering control system is well known in the art which includes a front power steering unit having a control valve for switching a direction of working fluid supplied to one side or another of a piston in a power cylinder for turning front wheels synchronously with the rotation of a steering shaft to provide assistance in steering the front wheels to the right or the left.

Recently, a steering rear wheels has been developed. This system further includes a rear power steering unit, as well as a front power steering unit, each having a control valve for controlling pressure of working fluid directed to a power cylinder dependent upon the lateral acceleration of a vehicle when turning, switching a direction of the working fluid applied to one or the other sides of a piston in the power cylinder according to vehicle speed. This control valve is operable to control the power cylinder for actively steering the rear wheels. The system requires separate pumps for building up working fluid pressure for directing working fluid to the front and rear power steering units.

However, the above prior art system requires separate hydraulic control circuits with independent pumps therefor for steering the front and rear wheels respectively. This results in a bulky system. In a case where such pumps are driven by engine power, it imposes an added load on the engine causing it to be slowed down. Further, space for accommodating the system is limited and thus installation thereof is difficult.

SUMMARY OF THE INVENTION

It is accordingly one object of the present invention to avoid the disadvantages of the prior art.

It is another object of the present invention to provide a compact steering control system for installation on a vehicle which is operable to control steering of front and rear wheels with minimum power consumption.

According to one aspect of the present invention, there is provided a system for controlling steering operations of the front and rear wheels of a vehicle comprising; first means for monitoring traveling condition parameters of the vehicle to provide signals indicative thereof; a first actuator for providing steering assistance for front wheels; a second actuator for providing steering assistance for rear wheels; a driving source for applying a driving force to the first and second actuators; and, second means for controlling distribution of the driving force provided by the driving source to the first and second actuators to steer the front and rear wheels with a preselected steering angle relationship therebetween when turning based on the signals from the first means.

In addition, the above-described aspect of the invention may also include a third actuator for providing assistance in steering the front wheels, the second means directing the driving force to the third actuator with blocking of the supply of the driving force to the first and second actuators below a preselected vehicle speed.

According to a further aspect of the invention, a system for controlling steering operation of front and rear wheels of a vehicle may comprise; monitoring means for monitoring traveling condition parameters of the vehicle to provide signals indicative thereof; a first actuator for steering the front wheels; a second actuator for steering the rear wheels; a third actuator for providing assistance in steering the front wheels below a preselected vehicle speed so as to reduce effort required by a driver to steer the front wheels; a single driving source for applying a driving force to the first, second, and third actuators; first means for blocking a supply of the driving force to the first and second actuators and directing the driving force to the third actuator below the preselected vehicle speed to steer the front wheels according to rotation of a steering wheel; and, second means for controlling a supply rate of the driving force to the first and second actuators above the preselected vehicle speed based on the signals from the monitoring means to provide a preselected steering angular relationship between the front and rear wheels when turning.

BRIEF DESCRIPTION OF THE DRAWINGS

The present invention will be understood from the detailed description given hereinbelow and from the accompanying drawings of the preferred embodiments which are given for explanation and understanding only and are not intended to imply limitations to the invention.

DESCRIPTION OF THE PREFERRED EMBODIMENT

Figure 1:
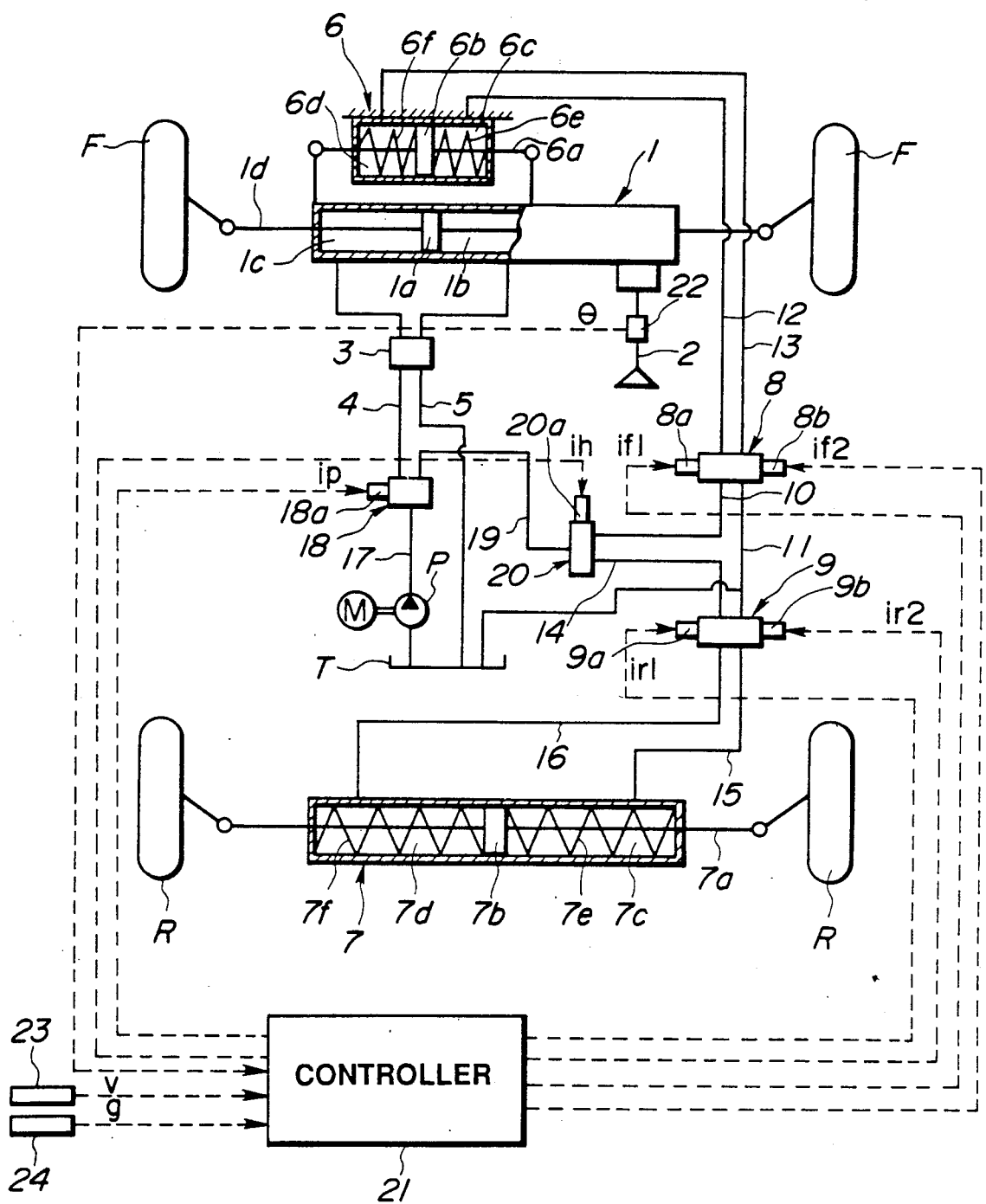
FIG. 1 is a schematic view which shows a steering control system according to the present invention.

Referring now to the drawings, particularly to FIG. 1, there is shown a steering control system according to the present invention. This system includes a power steering gear 1 (i.e., a power cylinder) which is operable to provide steering assistance as necessary for steering front wheels F by changing a direction of hydraulic fluid fed from a power steering valve 3 to one or the other sides of the power cylinder 1 according to rotation of a steering shaft 2. In the drawing, for the sake of simplicity, the power steering valve 3 is indicated away from the steering shaft 2, however actually the valve is disposed on the base of the steering shaft.

The power cylinder 1 includes separate chambers 1b and 1c defined by a piston 1a. The power steering valve 3 supplies the hydraulic fluid to either of the chambers 1b or 1c forcing a piston rod 1d to move, and the movement of the piston rod provides assistance in steering the front wheels when turning. The power steering valve 3 is connected to a fluid feed line 4 and a drain line 5.

The power cylinder 1 is installed on a vehicle frame through an insulating member (not shown) such as rubber so as to allow the power cylinder to move itself in the longitudinal direction thereof.

Additionally, a cylinder for front wheels 6 is rigidly attached to the power cylinder 1 which includes a piston rod 6a slidably disposed therewithin for providing major steering assistance to the front wheels. The front cylinder 6 is fixed on the vehicle frame.

Lateral displacement of the piston rod 6a causes the power cylinder 1 to move in the axial direction thereof with deformation of the insulator, thereby steering the front wheels at an angle corresponding to the movement of the power cylinder. The front cylinder 6 includes separate chambers defined by a piston 6b which is centered therein by spring force exerted by centering springs 6e and 6f.

The system further includes a cylinder for rear wheels 7 which is adapted for providing assistance in steering rear wheels R according to sliding motion of a piston rod 7a. The rear cylinder 7 includes separate chambers 7c and 7d defined by a piston 7b which is centered therein by spring force exerted by centering springs 7e and 7f.

Pressure control of hydraulic fluid and switching of the fluid supply direction to either chamber of front and rear cylinders 6 and 7 are accomplished by front and rear control valves 8 and 9 respectively.

The front control valve 8 is connected to a front feed line 10 and a drain line 11 with connection to chambers 6c and 6d of the front cylinder 6 through hydraulic power lines 12 and 13 respectively and is operable to supply pressurized hydraulic fluid to either of the chambers 6c and 6d according to shifting motion of a valve spool (not shown) dependent upon controlled current if1 and if2 applied to solenoids 8a and 8b and to control the fluid pressure.

The rear control valve 9 is connected to a fluid feed line for the front wheels 14 and the drain line 11 with connection to the chambers 7c and 7d of the rear cylinder 7 through hydraulic power lines 15 and 16 respectively and is operable to supply pressurized hydraulic fluid to either of the chambers 7c and 7d according to shifting motion of a valve spool (not shown) according to controlled current ir1 and ir2 applied to solenoids 9a and 9b and to control the fluid pressure.

A pump P is driven by a motor M to pump hydraulic fluid from a reservoir tank T, and directs it to a main power hydraulic line 17 for the power steering valve 3 and the front and rear control valves 8 and 9.

The main power hydraulic line 17 communicates with a first flow dividing valve 18 which is then connected to the fluid feed line 4 and an active control feed line 19. The first flow dividing valve 18 is operable to control the flow rate of hydraulic fluid to the fluid feed line 4 and the the active control feed line 19 according to operation of a solenoid 18a energized by control current ip.

Additionally, the active control feed line 19 is connected to a second flow dividing valve 20 which is operable to control the flow rate of hydraulic fluid to the fluid feed line for the front wheels 10 and the fluid feed line for the rear wheels 14 according to operation of a solenoid 20a energized by control current ih.

The system includes a steering angle sensor 22, a vehicle speed sensor 23, and an acceleration sensor 24. The steering angle sensor 22 is installed on the steering shaft 2 for sensing a steered angle of a steering wheel to provide a signal $\theta$ indicative thereof. The vehicle speed sensor 23 is installed on a drive shaft (not shown) to provide a signal V indicative of vehicle speed. The acceleration sensor 24 is installed on the vehicle body for sensing lateral acceleration of the vehicle to provide a signal g indicative thereof. The system further includes a controller 21 which receives the signals $\theta$, V, and g output from the sensors 22, 23, and 24 respectively to provide control currents if1, if2, ir1, ir2, ip, and ih to the first and second flow dividing valves 18 and 20 and the control valves 8 and 9 for controlling operation thereof based on the vehicle parameters $\theta$, V, and g.

The controller 21 provides control signals to the front and rear control valves 8 and 9 so that frequency characteristics of, for example, yaw rate and lateral acceleration of a vehicle are made flat to provide highly balanced stability and response when turning at a preselected speed or higher (this control is described in MOTOR FAN MAGAZINE, September, 1987, on pages 30 and 31; published by SANEISHOBO, Japan). In other words, a steering angle for the rear wheels R is controlled relative to a steered angle of the front wheels F with a preselected steering angle relationship therebetween at the preselected speed or higher to obtain driving stability. Control of the front and rear control valves will henceforth be referred to as 'active control'.

Figure 2:
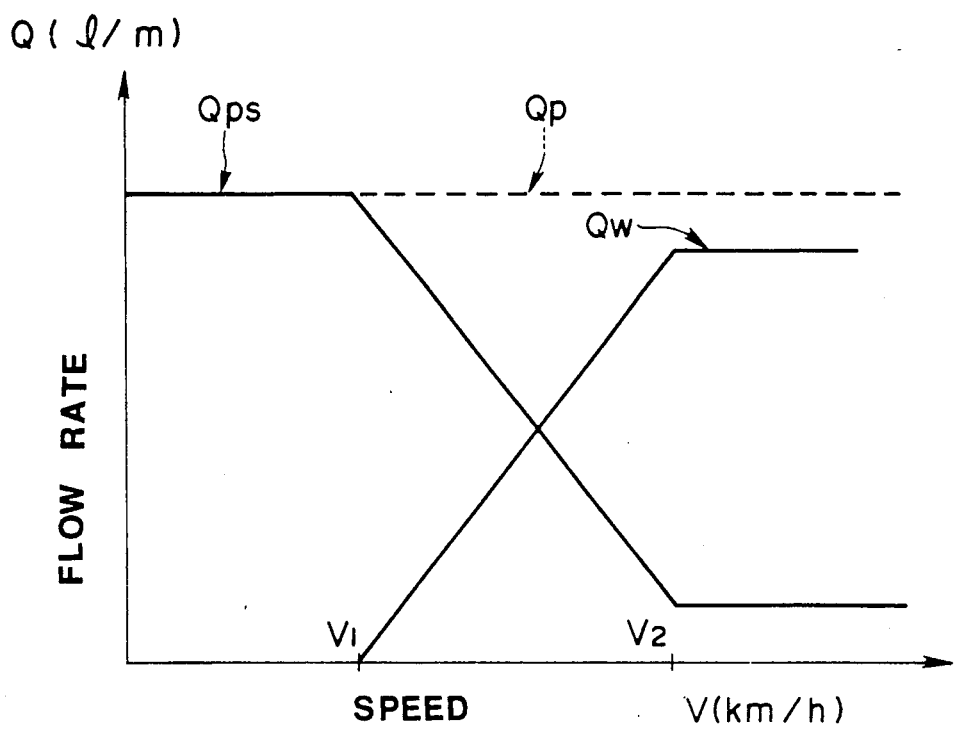
FIG. 2 is a graph which shows the flow rate of working fluid supplied to a first flow dividing valve incorporated in a system of the invention with respect to vehicle speed.

Referring to FIG. 2, control operation of the first flow dividing valve 18 is shown. In FIG. 2, the vertical axis indicates the flow rate Q (l/m) of hydraulic fluid to be applied to corresponding valves, while the horizontal axis indicates vehicle speed V (km/h). Qp indicates capacity, or the total amount of fluid discharged from the pump P, Qps indicates the flow rate supplied to the fluid feed line 4 for the power steering gear (i.e., to the power steering valve 3), and Qw indicates the flow rate supplied to the active control valve 19 (i.e., to control valves 8 and 9).

The graph shows that the active control is not operative below the preselected low speed $V_1$ and all pressurized hydraulic fluid discharged from the pump is fed to power cylinder 1 via the power steering valve 3 to provide assistance in steering the front wheels, as the vehicle speed becomes high, the flow rate to the power steering valve 3 is decreased, while the flow rate to front and rear cylinders 6 and 7 via the control valves 8 and 9 is increased, and above a preselected speed $V_2$, the steering force required to steer the wheels becomes quite small and thus steering assistance provided by the power cylinder 1 is unnecessary, fixing the flow rates of the Qps and Qw as indicated in the graph. When assistance provided by the power cylinder 1 becomes unnecessary, steering control is carried out via front cylinder 6 and rear cylinder 7.

Under active control, the second flow dividing valve 20 increases the flow rate of the hydraulic fluid to the front feed line 10 when driving force to the front cylinder 6 is necessary (at speeds above $V_1$) and increases the flow rate to the rear feed line 14 when driving force to the rear cylinder 7 is necessary.

The control current ih to the second flow dividing valve 20 is proportional to the control current if1 and if2 to the front control valve 8 and the control current ir1 and ir2 of the rear control valve 9. A flow rate of the hydraulic fluid from the second flow dividing valve proportional to these current values is provided.

In operation, when a vehicle is running at low speed, the high degree of steering assistance provided by the power cylinder 1 is necessary, while active control for the front and rear wheels is unnecessary when turning. Therefore, the first flow dividing valve 18 blocks the active control feed line 19 completely and fully opens the power steering feed line 4 so that all fluid discharged form the pump Qp is supplied to the power cylinder 1 through the valve 3 with the result that the flow rate Qps becomes maximum.

When the vehicle is running at intermediate speeds, the necessity of steering assistance is gradually decreased as the vehicle speed increases and active control to the front and rear wheels becomes gradually necessary. Thus, the first flow dividing valve 18 decreases the flow rate Qps to the fluid feed line 4 for the power cylinder 1 gradually, while the flow rate Qw to the active control feed line 19 is increased proportionally.

When the vehicle is running at high speeds, the steering assistance provided by the power cylinder 1 is almost completely unnecessary, while active control is performed frequently. Therefore, the first flow dividing valve 18 increases the flow rate Qw to the active control feed line 19 and restricts the flow rate Qps to the power steering feed line 4 down to a minimum level so that almost all the fluid discharged from the pump Qp is used for active control.

At intermediate and high speeds under active control, the second flow dividing valve 20 is controlled by the control currents if1, if2, ir1, and ir2 output to the control valves 8 and 9. As a result of this control, similar to that of the first flow dividing valve 18, the flow rate between the front feed line 10 and the rear feed line 14 is adjusted so as to increase the flow rate of hydraulic fluid to the cylinder (6 or 7) which requires more driving force.

It will be appreciated that control of the power cylinder and steering control for the front and rear wheels (i.e., active control), and active control between the front and rear wheels are simultaneously accomplished with a minimum flow rate from the pump.

It is thus apparent that the system according to the invention may be made compact with low energy consumption and is thus very advantageous for installation in a vehicle. It will further be apparent that the present invention, although disclosed in terms of the particular arrangement described hereinabove, may equivalently be achieved by changing the flow rate discharged from the first and second flow dividing valves according to control properties when turning.

Therefore, it should be understood that various changes and modifications may be made without departing from the sprit and scope of the invention as defined by the following claims. For instance, in place of hydraulic fluid, a gas such as air may be used for driving force in the system. Further, in the embodiment, steering of the front wheels is accomplished by two separate hydraulic cylinders, however, this may also be accomplished by a single cylinder.

What is claimed is:

1. A system for controlling steering operations of front and rear wheels of a vehicle comprising:
    monitoring means for monitoring traveling condition parameters of the vehicle to provide a signal indicative thereof;
    a first actuator for actively steering the front wheels;
    a second actuator for actively steering the rear wheels;
    a third actuator for providing assistance in steering the front wheels below a preselected vehicle speed so as to reduce effort required by a driver to steer the front wheels;
    a single driving source for applying a driving force to said first, second, and third actuators;
    a first line directing the driving force from said driving source to said first and second actuators;
    a second line directing the driving force from said driving source to said third actuator;
    first means, disposed between said driving source and said first and second lines, for controlling a supply rate of the driving source to said first and second lines;
    second means, disposed between said first line and said first and second actuators, for controlling a supply rate of the driving force to said first and second actuators; and
    control means for controlling said first means to provide a supply rate of the driving force to said second line higher than that to said first line when turning below the preselected vehicle speed, said control means being responsive to the signal from said monitoring means to control said second means to adjust a supply rate of the driving force to said first and second actuators for providing a preselected steering angular relationship between the front and rear wheels when turning.

2. A system as set forth in claim 1, wherein said monitoring means monitors vehicle speed to provide a signal indicative thereof, said first means including a first valve which directs driving force to said third actuator and blocks driving force to said first and second actuators below said preselected vehicle speed based on the signal from said monitoring means to provide assistance in steering the front wheels according to rotation of a steering wheel, said second means including a second valve which supplies the driving force to said first and second actuators at a preselected supply rate above the preselected vehicle speed to actively steer the front and rear wheels.

3. A system as set forth in claim 2, wherein said first, second, third actuators are hydraulic cylinders respectively, said driving source being a hydraulic fluid source, said first and second valves being first and second flow dividing valves, said first flow dividing valve dividing the hydraulic fluid provided by said hydraulic fluid source between said first and second hydraulic cylinders and said third hydraulic cylinder below the preselected vehicle speed, said second flow dividing valve dividing the hydraulic fluid between said first hydraulic cylinder and said second hydraulic cylinder above the preselected vehicle speed.

4. A system as set forth in claim 3, wherein said first flow dividing valve is situated between said hydraulic fluid source and said third hydraulic cylinder and between said hydraulic fluid source and said second dividing valve, said second flow dividing valve being situated between said first flow dividing valve and said first hydraulic cylinder and between said first flow dividing valve and said second hydraulic cylinder.

5. A system as set forth in claim 1, wherein said first actuator is rigidly connected to said third actuator, said control means being responsive to the signal from said monitoring means to activate said first actuator to move said third actuator for actively steering the front wheels.

* * * * *